United States Patent
Newton et al.

(10) Patent No.: US 9,283,584 B2
(45) Date of Patent: Mar. 15, 2016

(54) LIQUID DELIVERY SYSTEM

(75) Inventors: John R. Newton, Vero Beach, FL (US); Michael E. Cheney, Vero Beach, FL (US); Peter J. Brooke, Micco, FL (US)

(73) Assignee: Global Agricultural Technology and Engineering, LLC, Vero Beach, FL (US)

( * ) Notice: Subject to any disclaimer, the term of this patent is extended or adjusted under 35 U.S.C. 154(b) by 118 days.

(21) Appl. No.: 13/997,297

(22) PCT Filed: Dec. 28, 2011

(86) PCT No.: PCT/US2011/067506
§ 371 (c)(1),
(2), (4) Date: Oct. 7, 2013

(87) PCT Pub. No.: WO2012/094202
PCT Pub. Date: Jul. 12, 2012

(65) Prior Publication Data
US 2014/0027540 A1    Jan. 30, 2014

Related U.S. Application Data

(63) Continuation-in-part of application No. 12/983,443, filed on Jan. 3, 2011, now abandoned, and a continuation-in-part of application No. 13/169,254, filed on Jun. 27, 2011, now abandoned.

(51) Int. Cl.
*B05B 7/26* (2006.01)
*B05B 12/08* (2006.01)
*A01C 23/04* (2006.01)

(52) U.S. Cl.
CPC .............. *B05B 12/08* (2013.01); *A01C 23/042* (2013.01)

(58) Field of Classification Search
CPC .............................. B05B 12/08; A01C 23/042
USPC ................. 137/565.3; 169/15, 44, 46, 69, 66; 417/4, 5, 199.1, 201, 426, 3
See application file for complete search history.

(56) References Cited

U.S. PATENT DOCUMENTS 2,693,196 A * 11/1954 Hundley ..................... 137/195
2,919,834 A    1/1960 Rugeley et al.
(Continued)

FOREIGN PATENT DOCUMENTS

JP    S63-083479 A    4/1988
JP    2004-344695    12/2004
(Continued)

OTHER PUBLICATIONS

First Office Action issued by the State Intellectual Property Office of the People's Republic of China and English translation thereof, issued on Aug. 1, 2014 in connection with Chinese Application No. 201180063929.3, 7 pages.
(Continued)

*Primary Examiner* — Arthur O Hall
*Assistant Examiner* — Viet Le
(74) *Attorney, Agent, or Firm* — Gesmer Updegrove LLP

(57) ABSTRACT

A liquid delivery system comprises a tank containing a supply of liquid. A positive displacement pump operates to withdraw the liquid from the tank via a suction conduit and to deliver a pressurized flow of the liquid via a delivery conduit. A metering orifice in the delivery conduit serves to modulate the flow of the liquid through the delivery conduit. A normally closed first valve located in the delivery conduit between the pump and the metering orifice is opened in response to a pressure of the liquid exceeding a threshold level, and is operative when open to deliver the liquid to the metering orifice at a substantially constant pressure. A bypass conduit communicates with the tank and with the delivery conduit at a location between the pump and the first valve. A flow restrictor in the bypass conduit serves to modulate a return flow of the liquid from the delivery conduit to the tank, thereby modulating the pressure of the liquid being delivered to the first valve.

7 Claims, 1 Drawing Sheet

(56) References Cited

U.S. PATENT DOCUMENTS

| | | | |
|---|---|---|---|
| 4,337,786 | A | 7/1982 | Myers et al. |
| 4,609,149 | A | 9/1986 | Jessen |
| 5,360,139 | A | 11/1994 | Goode |
| 6,026,850 | A | 2/2000 | Newton et al. |
| 6,164,557 | A | 12/2000 | Larson |
| 6,209,578 | B1 | 4/2001 | Newton |
| 7,363,938 | B1 | 4/2008 | Newton |
| 7,445,021 | B2 | 11/2008 | Newton |
| 2008/0277000 | A1 | 11/2008 | Gammon |
| 2010/0025494 | A1* | 2/2010 | McDonald ............ 239/310 |
| 2010/0200609 | A1 | 8/2010 | Cadigan |

FOREIGN PATENT DOCUMENTS

| | | | |
|---|---|---|---|
| JP | 2008-079530 | A | 4/2008 |
| JP | 2009-501362 | A | 1/2009 |
| WO | 0170008 | A | 9/2001 |

OTHER PUBLICATIONS

International Preliminary Report on Patentability issued on Jul. 18, 2013 in connection with International Application PCT/US2011/067506, 6 pages.

International Search Report and Written Opinion issued on Apr. 17, 2012 in connection with International Application PCT/US2011/067506, 9 pages.

Second Office Action issued in CN Application No. 201180063929.3 Jun. 30, 2015, 6 pages.

Office Action issued by the Japanese Patent Office on Jul. 28, 2015 in connection with related Japanese patent application No. 2013-547634, 2 pages.

MX Office Action mailed on May 19, 2015 in connection with corresponding MX Application No. 2013/007810.

Extended European Search Report issued on Jun. 5, 2015 in related European Patent App. No. 11855170.4, 7 pages.

\* cited by examiner

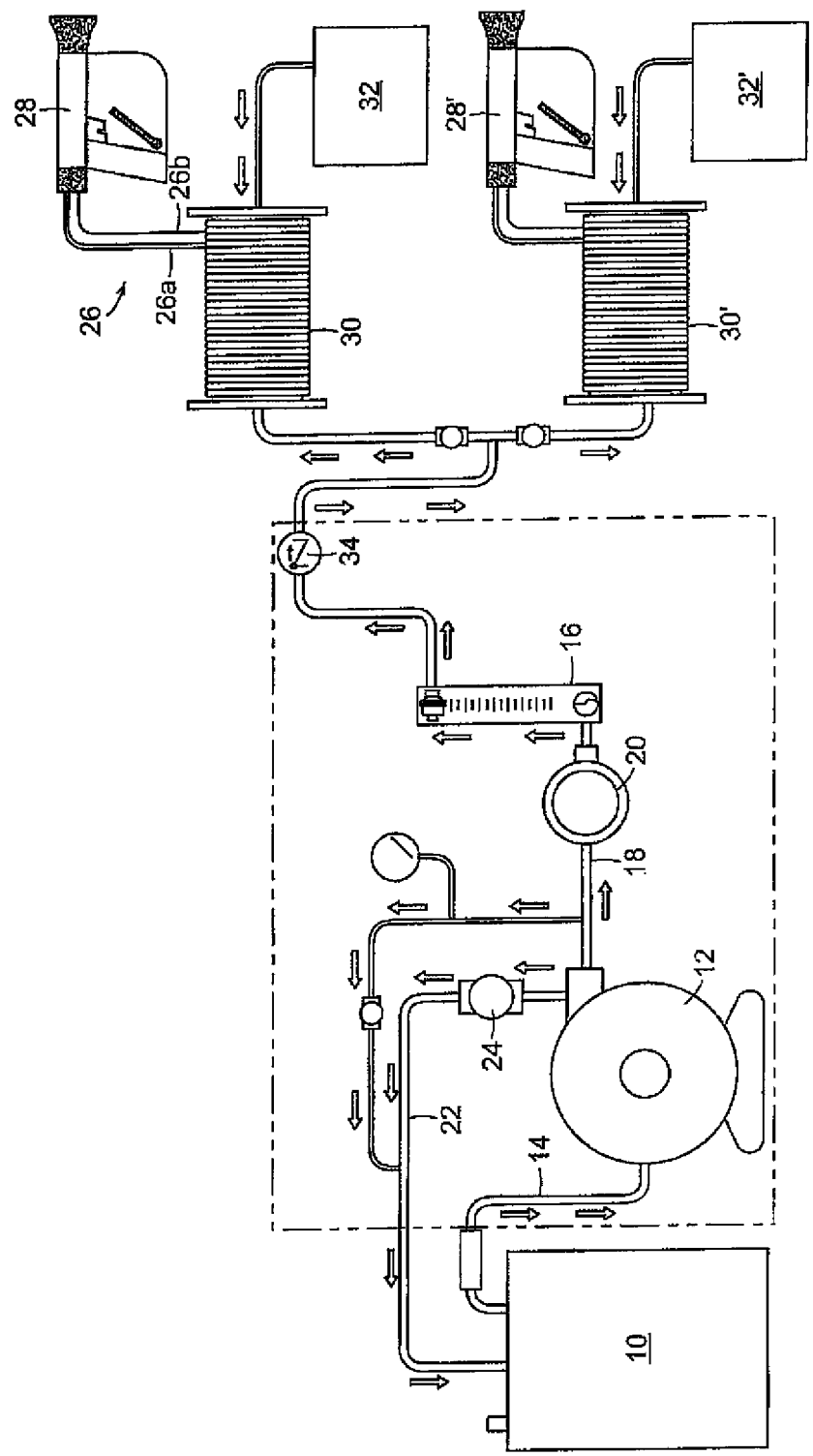

9,283,584 B2

LIQUID DELIVERY SYSTEM

PRIORITY INFORMATION

The present invention is a U.S. national stage application under 35 U.S.C. 371 of PCT/US2011/067506 filed Dec. 28, 2011, which in turn claims priority to U.S. application Ser. No. 13/169,254, filed Jun. 27, 2011 and U.S. application Ser. No. 12/983,443 filed Jan. 3, 2011, all of which are incorporated herein by reference in their entireties.

BACKGROUND DISCUSSION

1. Field of the Invention

This invention relates generally to systems for precisely controlling the delivery of liquids, and is particularly suited for although not limited in use to lawn treatment systems for alternatively applying either a water diluted fertilizer, or a mixture of the water diluted fertilizer and a liquid pest control product, e.g., an insecticide or pesticide.

2. Description of the Prior Art

Lawn treatment systems of the above-described type are known, as evidenced for example by the disclosure in U.S. Pat. No. 4,609,149. Such systems are typically truck or trailer mounted, with storage tanks containing the liquids to be dispensed, and pumps for delivering the liquids via separate hoses to a portable applicator gun which may be operated to apply a single liquid, e.g., water diluted fertilizer, or a mixture of the water diluted fertilizer and the liquid pest control product. While such systems operate in a generally satisfactory manner, they lack adequate means for precisely controlling the amount of pest control product being delivered to the applicator gun. This can result in either inadequate treatment, which allows insects and weeds to flourish, or over treatment, which can be harmful to the grasses being cultivated The objective of the present invention is to address this shortcoming of the prior art, in addition to providing other important advantages.

SUMMARY OF THE INVENTION

An exemplary embodiment of a system in accordance with the present invention comprises a tank containing a supply of a "first liquid", which may for example comprise a liquid pest control product. As herein employed, the term "tank" is to be broadly interpreted to encompass all types of containers in which liquids can be stored. A positive displacement pump operates to withdraw the first liquid from the tank via a suction conduit, and to deliver a pressurized flow of the first liquid via a delivery conduit. A metering orifice, which may either be fixed or adjustable, is provided in the delivery conduit to modulate the flow of the first liquid.

A first valve is located in the delivery conduit between the pump and the metering orifice. The first valve is normally closed, is opened in response to a pressure of the first liquid exceeding a threshold level, and when open, is operative to deliver the first liquid to the metering orifice at a substantially constant pressure.

A bypass conduit communicates with the tank and the delivery conduit at a location between the first valve and the pump. A flow restrictor modulates flow in the bypass conduit. The flow restrictor may comprise a second valve that is adjustable to vary the return flow of the first liquid from the delivery conduit to the tank, thereby varying the pressure of the first liquid being delivered to the first valve. Alternatively, the flow restrictor may comprise a second fixed metering orifice sized to accommodate a set return flow of the first liquid.

Preferably, a pressure gauge is provided for visually displaying the pressure of the first liquid being delivered to the first valve, and the metering orifice also includes a visual display of the volume of the first liquid flowing through the delivery conduit.

In the disclosed embodiment, the system further comprises at least one delivery hose having first and second hose conduits leading to a handgun. The delivery conduit is connected to the first hose conduit, and the second hose conduit is connected to a pressurized source of a "second liquid", which may for example comprise water diluted fertilizer. The handgun is adapted to alternatively deliver only the second liquid, or a mixture of the first and second liquids.

These and other features and attendant advantages of the present invention will now be described in greater detail with reference to the accompanying drawings, wherein:

BRIEF DESCRIPTION OF THE DRAWING

The drawing is a diagrammatic illustration of a system embodying the concepts of the present invention.

DETAILED DESCRIPTION

The drawing diagrammatically depicts an exemplary embodiment of a system in accordance with the present invention for selectively dispensing either the second liquid or a mixture of the second liquid and the first liquid. Typically, the first liquid may comprise water diluted insecticide or fungicide and the second liquid may comprise a water diluted fertilizer.

A first tank 10 is adapted to contain a supply of the first liquid. A positive displacement pump 12 is operable to withdraw the first liquid from the tank 10 via a suction line 14 and to deliver a pressurized flow of the first liquid to a metering orifice 16 in a delivery conduit 18. The metering orifice serves to modulate liquid flow, and it may either be fixed or adjustable. Preferably, the metering orifice includes a gauge for visibly displaying flow volume.

A first valve 20 is located in the delivery conduit 18. The first valve is of the constant flow type, examples of which are disclosed in U.S. Pat. Nos. 6,026,850; 6,208,578; 7,445,021 and 7,363,938, the descriptions of which are herein incorporated by reference. Valve 20 is normally closed, is opened in response to liquid pressure exceeding a threshold level, and is operative when open to deliver liquid to the metering orifice as a substantially constant pressure. Thus, for any given size of the metering orifice 16, the volume of flow passing therethrough will remain substantially constant, thereby avoiding inadequate or excessive application of the first liquid.

A bypass conduit 22 communicates with tank 10 and with the delivery conduit at a location between the pump 12 and the first valve 20. A flow restrictor 24 modulates flow in the bypass conduit. The flow restrictor may comprise a second valve that is adjustable to accommodate a variable return flow of the first liquid from the delivery conduit 18 to the tank 10. Alternatively, the flow restrictor may comprise a fixed metering orifice sized to accommodate a set flow of the first liquid. This return flow constantly agitates the tank contents while guarding against over pressurization of components downstream of the pump 12.

The system may further comprise at least one delivery hose 26 leading to a portable handgun 28. The delivery hose is of a known type which includes first and second hose conduits 26a, 26b. The delivery hose is stored on a reel 30, with the first hose conduit 26a connected to the delivery conduit 18, and the second hose conduit 26b connected to a second tank 32 containing a pressurized source of the second liquid. The handgun 28 is adapted to alternatively deliver only the second liquid, or a mixture of the first and second liquids.

In the illustrated embodiment, a second hose reel 30', handgun 28' and tank 32' containing a pressurized source of a different second liquid are included. A check valve 34 prevents back flow in the delivery conduit 18.

In light of the foregoing, it will now be appreciated by those skilled in the art that the system of the present invention is not limited in use to the controlled delivery of the liquids herein chosen for purposes of disclosure. Rather, at least that portion of the system enclosed by broken lines in the drawing may be used to control the delivery of liquids in general for application by a variety of means other than the disclosed handguns and associated hoses and reels.

We claim:

1. A system for delivering a metered flow of liquid, said system comprising:
    a tank containing a supply of the liquid;
    a positive displacement pump, said pump being operable to withdraw the liquid from said tank via a suction conduit and to deliver a pressurized flow of the liquid via a delivery conduit;
    a metering orifice in said delivery conduit, said metering orifice being sized to modulate the flow of the liquid through said delivery conduit; a valve located in said delivery conduit between said pump and said metering orifice, said valve being normally closed, being opened in response to a pressure of the liquid exceeding a threshold level, and being operative when open to deliver the liquid to said metering orifice at a substantially constant pressure;
    a bypass conduit communicating with said tank and with said delivery conduit at a location between said pump and said first valve, said bypass conduit being configured and arranged to return a continuous flow of said liquid from said pump to said tank to constantly agitate the contents of said tank and to prevent overpressurization of system components downstream of said pump during operation of said pump; and
    a flow restrictor in said bypass conduit, said flow restrictor serving to modulate a return flow of the liquid from said delivery conduit to said tank.

2. The system of claim 1 wherein said flow restrictor comprises a second valve that is adjustable to accommodate a variable return flow of the liquid from said delivery conduit to said tank.

3. The system of claim 1 wherein said flow restrictor comprises a fixed metering orifice sized to accommodate a set return flow of the liquid from said delivery conduit to said tank.

4. The system of claim 1 further comprising a pressure gauge for visually displaying the pressure of the liquid being delivered to said first valve.

5. The system of claim 1 wherein said metering orifice includes a visual display of the volume of the liquid flowing through said delivery conduit.

6. The system of claim 1 further comprising at least one delivery hose having first and second hose conduits leading to a handgun, said first hose conduit being connected to said delivery conduit, and said second hose conduit being connected to a pressurized source of a second liquid, said handgun being adapted to alternatively deliver only said second liquid, or a mixture of the first mentioned liquid and said second liquid.

7. The system of claim 1 wherein said metering orifice is adjustable to vary the flow of the liquid through said delivery conduit.

* * * * *